US011698961B2

(12) United States Patent
Eggleton et al.

(10) Patent No.: US 11,698,961 B2
(45) Date of Patent: Jul. 11, 2023

(54) SYSTEM EVENT DETECTION SYSTEM AND METHOD

(71) Applicant: Palantir Technologies Inc., Denver, CO (US)

(72) Inventors: Andrew Eggleton, Sydney (AU); Elliot Colquhoun, Auckland (NZ); Ranec Highet, London (GB); Xiao Tang, Singapore (SG); Tareq Alkhatib, Richmond (CA); Raj Krishnan, Doha (QA); Nik Seetharaman, Sydney (AU); Brandon Helms, Washington, DC (US); Gautam Punukollu, New York, NY (US); Morten Kromann, Doha (QA)

(73) Assignee: Palantir Technologies Inc., Denver, CO (US)

( * ) Notice: Subject to any disclaimer, the term of this patent is extended or adjusted under 35 U.S.C. 154(b) by 278 days.

(21) Appl. No.: 16/549,261

(22) Filed: Aug. 23, 2019

(65) Prior Publication Data

US 2021/0026952 A1    Jan. 28, 2021

(30) Foreign Application Priority Data

Jul. 25, 2019 (GB) ........................... 1910654

(51) Int. Cl.
*G06F 21/00* (2013.01)
*G06F 21/55* (2013.01)
*G06F 21/57* (2013.01)

(52) U.S. Cl.
CPC .......... *G06F 21/552* (2013.01); *G06F 21/577* (2013.01); *G06F 2221/034* (2013.01)

(58) Field of Classification Search
CPC ...... G06F 21/50; G06F 21/552; G06F 21/577; G06F 2221/034; H04L 63/14
USPC ............................................................ 726/23
See application file for complete search history.

(56) References Cited

U.S. PATENT DOCUMENTS

| | | | |
|---|---|---|---|
| 9,992,230 B1 | 6/2018 | Haverty et al. | |
| 10,129,290 B2* | 11/2018 | Thomas | H04L 63/1408 |
| 2018/0084012 A1 | 3/2018 | Joseph et al. | |
| 2018/0218050 A1 | 8/2018 | Porath et al. | |
| 2019/0036864 A1* | 1/2019 | Reuss | H04L 63/123 |
| 2019/0294781 A1* | 9/2019 | Keren | G06F 11/3409 |
| 2020/0186569 A1* | 6/2020 | Milazzo | H04L 63/1416 |
| 2021/0026952 A1* | 1/2021 | Eggleton | G06F 21/552 |

(Continued)

OTHER PUBLICATIONS

Official Communication for European Patent Application No. 19193347.2 dated Feb. 19, 2020.

*Primary Examiner* — Josnel Jeudy
(74) *Attorney, Agent, or Firm* — Knobbe, Martens, Olson & Bear, LLP

(57) ABSTRACT

A method, performed by one or more processors, including receiving a plurality of system event records; processing the plurality of system event records using a set of event detectors to determine that a suspicious system event has occurred; sending, to a client device, a plurality of properties associated with the suspicious system event; receiving, from the client device, a selection indicator indicating a selected one or more properties of the plurality of properties; generating one or more new event detectors based on the selected one or more properties; and adding the one or more new event detectors to the set of event detectors.

14 Claims, 6 Drawing Sheets

(56) References Cited

U.S. PATENT DOCUMENTS

| | | | |
|---|---|---|---|
| 2021/0034611 A1* | 2/2021 | Asokan | G06F 16/248 |
| 2021/0097172 A1* | 4/2021 | Colquhoun | H04L 63/1425 |
| 2021/0149790 A1* | 5/2021 | Renner | G06F 16/113 |

* cited by examiner

SYSTEM EVENT DETECTION SYSTEM AND METHOD

TECHNICAL FIELD

The present disclosure relates to systems and methods for detecting occurrences of suspicious system events.

BACKGROUND

Organizations cannot react to cybersecurity incidents that they cannot observe or understand. Information indicative of cybersecurity incidents may be in a format that security analysts cannot easily understand or analyze, e.g. raw and unstructured log files. Furthermore, data associated with the cybersecurity threat may be inaccessible, or at least difficult to access, by security analysts. Therefore, suspicious cybersecurity events occurring in organizations' systems may not be detected or, if detected, the inaccessibility of the associated data may prevent such events from being usefully analyzed. For example, the inaccessibility of the associated data may prevent the protection and integrity of an organizations data and information systems assets from being ensured.

SUMMARY

According to a first aspect of the specification, there is provided a method, performed by one or more processors, including: receiving a plurality of system event records; processing the plurality of system event records using a set of event detectors to determine that a suspicious system event has occurred; and sending, to a client device, a plurality of properties associated with the suspicious system event.

The method may include receiving, from the client device, a selection indicator indicating a selected one or more properties of the plurality of properties; generating one or more new event detectors based on the selected one or more properties; and adding the one or more new event detectors to the set of event detectors.

The plurality of system event records may include system log records.

The plurality of system event records may include records generated by a security monitoring application.

The method may include generating an event descriptor based on one or more system event records of the plurality of system event records associated with the suspicious system event, wherein the event descriptor comprises the plurality of properties associated with the suspicious system event.

The method may include sending the event descriptor to the client device.

The plurality of system event records may include receiving a respective one or more system event records for each of a plurality of systems.

The suspicious system event may be associated with one or more system descriptors. The one or more system descriptors may include one or more properties of one or more systems on which the suspicious system event occurred.

The method may include sending the one or more system descriptors to the client device.

The one or more system descriptors may be associated with one or more vulnerability descriptors. The one or more vulnerability descriptors may include properties of one or more known security vulnerabilities of the one or more systems on which the suspicious system event occurred.

The method may include sending the one or more vulnerability descriptors to a client device.

The method may include receiving a second plurality of system event records; and determining a second one or more system event records of the second plurality of system event records to be indicative of an occurrence of a second suspicious system event based on the one or more new event detectors.

The method may include sending a plurality of properties associated with the second suspicious system event to the client device.

A second aspect of the specification provides a method, performed by one or more processors, including: receiving a plurality of properties associated with a suspicious system event; and displaying the plurality of properties.

The method may include receiving an input indicative of a selection of one or more properties of the plurality of properties; and sending, to a server, a selection indicator indicating the selected one or more properties of the plurality of properties.

The method may include receiving an event descriptor. The event descriptor may include the plurality of properties associated with the suspicious system event.

The method may include: receiving one or more system descriptors; and displaying the one or more properties of the one or more systems. The one or more system descriptors may include one or more properties of one or more systems on which the suspicious system event occurred The method may include receiving one or more vulnerability descriptors associated with the one or more system descriptors, wherein; and displaying the one or more properties of the one or more known security vulnerabilities. The one or more vulnerability descriptors may include one or more properties of one or more known security vulnerabilities of the one or more systems on which the suspicious system event occurred The method may include receiving, from the server, a plurality of properties associated with a second suspicious system event; and displaying the plurality of properties associated with the second suspicious system event. The server may have determined that the second suspicious system event has occurred based on one or more new event detectors. The one or more new event detectors may have been generated by the server based on the selection indicator.

According to a third aspect of the specification, there is provided a method, performed by one or more processors, including: receiving, from a client device, a selection indicator indicating a selected one or more properties of a plurality of properties; generating one or more new event detectors based on the selected one or more properties; and adding the one or more new event detectors to a set of event detectors.

According to a fourth aspect of the specification, there is provided a method, performed by one or more processors, including: receiving an input indicative of a selection of one or more properties of a plurality of properties; and sending, to a server, a selection indicator indicating the selected one or more properties of the plurality of properties.

According to a fifth aspect of the specification, there is provided a computer program, optionally stored on a non-transitory computer readable medium, which, when executed by one or more processors of a data processing apparatus cause the data processing apparatus to carry out any of the methods described.

A sixth aspect of the specification provides an apparatus configured to carry out any of the methods described. The apparatus may include one or more processors.

According to a seventh aspect of the specification, there is provided a system including: one or more servers comprising one or more processors configured to carry out any of the methods described in relation to the first aspect of the specification; and one or more client devices comprising one or more processors configured to carry out any of the methods described in relation to the second aspect of the specification.

According to an eighth aspect of the specification, there is provided a system including: one or more servers comprising one or more processors configured to carry out any of the methods described in relation to the third aspect of the specification; and one or more client devices comprising one or more processors configured to carry out any of the methods described in relation to the fourth aspect of the specification.

Certain embodiments of the subject matter described in this specification provide one or more of the following technical advantages.

A first technical advantage is improving the detection of suspicious system events. Improving the detection of suspicious system events may improve the detection of associated cybersecurity incidents and cybersecurity threats. Improved detection of suspicious system events may be achieved by providing a compounding cybersecurity data asset. The cybersecurity data asset may be compounded by the use of detected suspicious system events, and properties thereof, to generate detectors to detect future suspicious system events. Compounding may occur as these generated detectors may facilitate the detection of more suspicious system events which may, in turn, be used to generate more detectors. These steps may be iterated and a virtuous cycle provided whereby detection of suspicious system events, and associated cybersecurity incidents, improves exponentially.

Further technical advantages include prompting the mitigation or rectification of cybersecurity incidents and the prevention of future cybersecurity incidents. These technical advantages may be achieved by automatically detecting suspicious system events by monitoring the prevailing internal state of monitored systems and providing details of this prevailing internal state and associated information, e.g. information about the current state of a network used by the monitored systems and known security vulnerabilities, to a cybersecurity analyst. The provided details and information may prompt the cybersecurity analyst to interact with the monitored systems to perform appropriate technical operations, e.g. patching one or more of the monitored systems or blocking one or more suspicious devices from the network.

BRIEF DESCRIPTION OF THE DRAWINGS

The features of the subject innovations are set forth in the appended claims. However, for purpose of explanation, several aspects of the disclosed subject matter are set forth in the following figures.

DETAILED DESCRIPTION

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Suspicious Event Detection System

Figure 1:
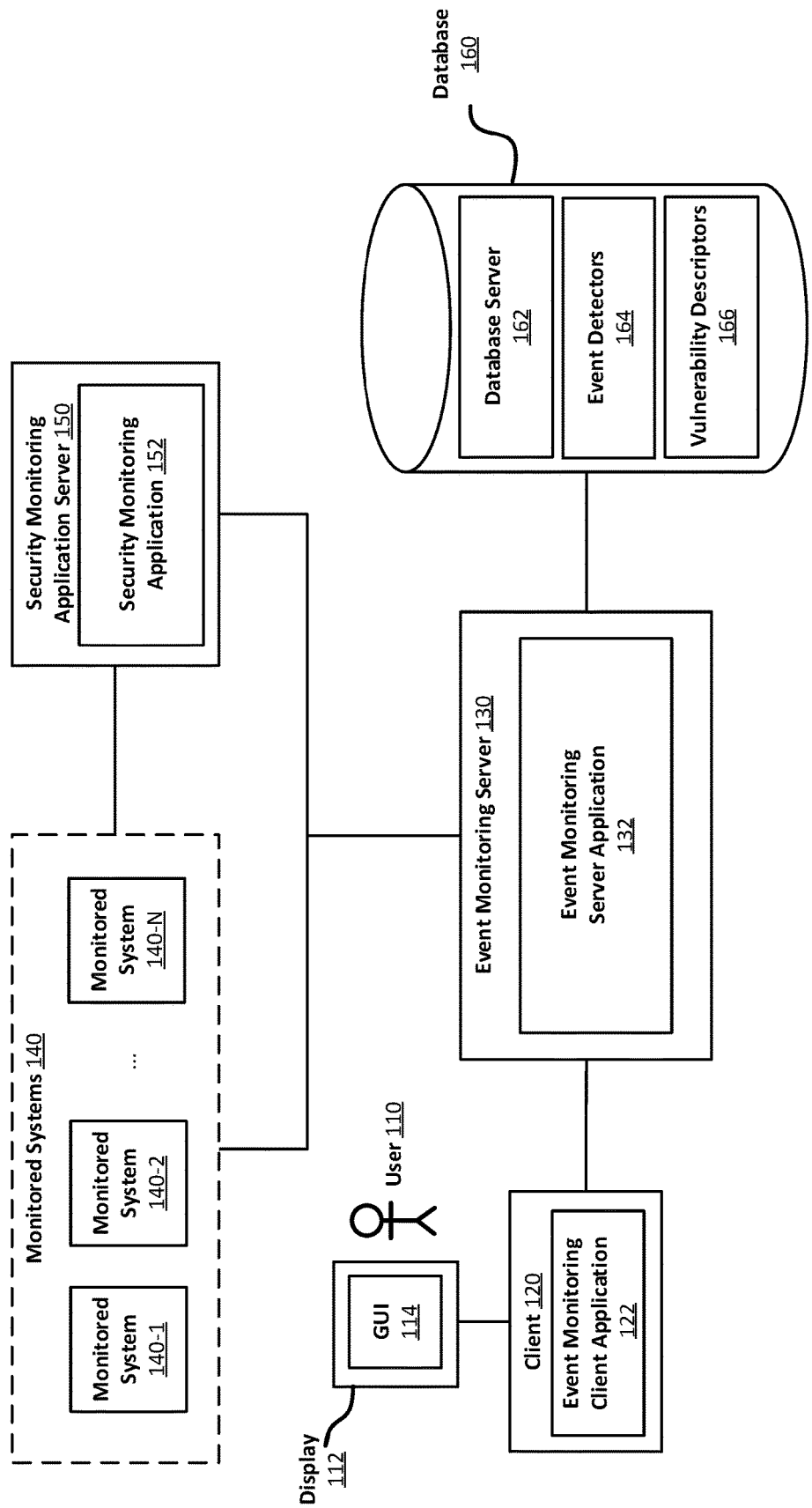
FIG. 1 is a block diagram illustrating an example of a computer system configured to detect occurrences of suspicious system events, in accordance with example embodiments.

FIG. 1 illustrates an example of a computer system configured to detect occurrences of suspicious system events, henceforth referred to as suspicious event detection system 100. The suspicious system event may be indicative of a cybersecurity incident or of a probable cybersecurity incident. As shown, the computer system 100 includes a client computing device 120 used by a human user 110, an event monitoring server 130, one or more monitored systems 140 (including monitored systems 140-1, 140-2, 140-N), a security monitoring application server 150, and a database 160. The client computing device 120 and the event monitoring system may be configured to communicate with one another via a network (not shown). The network may include the Internet, an intranet, a local area network, a wide area network, a wired network, a wireless network, a virtual private network (VPN), and/or any combination of such networks, whether wireless or wired. For ease of understanding, various components of the system have each been described with reference to one or more computing devices. It should be noted that, in some embodiments, any number of these components may be collocated on the same computing device.

The client computing device 120 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 120 may include one or more of a keyboard, a mouse, a display 112, or a touch screen (of which display 112 may be a part of). For example, the client computing device 120 may be composed of hardware components like those of computing device 500 described below with respect to FIG. 5.

The client computing device 120 may also include a web browser or a client application configured to display, in a graphical user interface 114 of the display 112, a computer program for monitoring suspicious system events. Such a computer program may be or allow the user to access the functionality of an event monitoring client application 122. The graphical user interface 114 may be a web browser window, a client application window, an operating system window, an integrated development environment window, a virtual terminal window or other computer graphical user interface window. While only one user 110 and one client computing device 120 are illustrated in FIG. 1, the subject innovations may be implemented in conjunction with one or more users 110 and one or more client computing devices 120.

The client computing device 120 may include the event monitoring client application 122. The event monitoring client application 122 may communicate with the event monitoring server 130. The event monitoring client application 122 may receive information associated with suspicious system events from the event monitoring server 130. The event monitoring client application 122 may cause the received information to be displayed and/or stored, temporarily or persistently, on the client computing device 120. The event monitoring client application 122 may also provide indications of inputs provided by the user 110 to the event monitoring server 130. In response to these provided indications of inputs, the event monitoring client application 122 may receive, and the event monitoring server 130 may provide, further details relating to a suspicious system event, e.g. properties of a monitored system 140 on which the suspicious system event was detected, known vulnerabilities of the monitored system 140, and/or details of actors known, or likely, to be responsible for the suspicious system event. These received further details may be displayed by the event monitoring client application 122. The event monitoring client application 122 may also provide indications to the event monitoring server 130 which are usable, by the event monitoring server 130, to improve detection of suspicious system events.

The event monitoring client application 122 may be configured to receive a plurality of properties associated with a suspicious system event; display the plurality of properties; receive an input indicative of a selection of one or more properties of the plurality of properties; and send, to the event monitoring server 130, a selection indicator indicating the selected one or more properties of the plurality of properties.

The plurality of properties associated with the suspicious system event may be received from the event monitoring server 130. The plurality of properties may be received using any suitable mechanism, e.g. via a remote service call, a representational state transfer (REST) operation, an internal networking protocol; and/or memory or persistent storage shared between the client 120 and the event monitoring server 130. The plurality of properties may be received in any suitable form. For example, the plurality of properties may be received as a series of strings, XML formatted data, a JSON object, a file and/or a platform specific markup or binary format.

The plurality of properties may include any number of: an identifier for the suspicious system event; an indicator or indicator of compromise for the suspicious system event; a time at which the suspicious system event occurred; details of a system on which the suspicious system event occurred, e.g. hostname, a network address, operating system details, etc.; details of one or more security vulnerabilities associated with one or more system(s) on which the suspicious system event occurred; details of a network and/or network zone within which the suspicious system event occurred; details of a remote service call associated with a suspicious system event; a number of times a similar or identical suspicious system event has occurred; details of one or more actor known to be, or likely to be, responsible for the suspicious system event, e.g. the actor name and/or type; details of an application causing the suspicious system event; and/or details of malware responsible for or otherwise related to the suspicious system event.

The received plurality of properties may be comprised in an event descriptor, which is received by the event monitoring client application 122. The event descriptor may structure these properties in such a way that they are understandable by the user, and/or practicable to be displayed to the user in an understandable way in a graphical user interface.

The plurality of properties may be displayed on the display 112 as part of the GUI 114 which may take any of the forms described. An example GUI 600 is described later on with reference to FIG. 6. The plurality of properties may be displayed on the screen simultaneously or using user interface elements whereby the user provides inputs to access one or more of the plurality of properties. For example, the user may scroll down or scroll across to access one or more of the plurality of properties and/or may click a user interface element, e.g. an expand button, to access one or more of the plurality of properties. Where an event descriptor comprising the plurality of properties is received, the plurality of properties may be displayed in a format corresponding to and/or based on the structure of the event descriptor.

The event monitoring client application 122 may receive the input indicative of a selection of one or more properties of the plurality of properties in any suitable form. For example, the input may be a pointer input, e.g. a mouse click or tap, on one or more user interface elements displaying the one or more properties of the plurality of properties. Alternatively or additionally, the input may be received using one or more keyboard presses, e.g. the user may highlight the one or more properties using the arrow keys and press enter to confirm that they are the properties that they wish to select. In addition to providing an input indicative of a selection, the user may be able to provide one or more related inputs. For example, the user may be provided with a dialogue whereby they can specify variations of the selected one or more properties and/or details of rules based on the one or more properties, e.g. rules denoting combinations of properties to be detected. The specified rules may denote combinations based on Boolean relationships between property values. These Boolean relationships may include AND, OR and/or NOT operations. For example, a rule based on Boolean relationships between property values may have the form: Property_1=(Value_1 OR Value_2) AND ((Property_2=(Value_3 OR Value_4) OR (Property_2=Value_5 AND NOT (Property_3=Value_6))). A rule based on Boolean relationships having this form may, for example, be (Network Zone=(RiskyZone OR DangerousZone) AND ((Operating System=(OldOS OR OlderOS) OR (Operating System=NewOS AND NOT (Property_4=Value_6))).

The selection indicator indicating the selected one or more properties may be sent to the server using any suitable mechanism, e.g. via a remote service call, a representational state transfer (REST) operation, an internal networking protocol; and/or memory or persistent storage shared between the client 120 and the event monitoring server 130. The selection indicator may take any suitable form, e.g. the selection indicator may be one or more strings, XML formatted data, a JSON object, a file and/or a platform specific markup or binary format. In addition to indicating the selected one or more properties, the selection indicator may also include details of specified variations of the selected one or more properties and/or details of rules based on the one or more properties.

The event monitoring client application 122 may further receive one or more system descriptors. The one or more system descriptors include one or more properties of one or more system(s) on which the suspicious system event occurred. For example, the one or more properties of the system(s) may be any number or combination of: a system hostname; a system IP address; a system MAC address; a system network zone; an operating system name; an operating system version; a date and/or time of a system update; and a list of applications installed on the system. These one or more system descriptors may be received with the plurality of properties, and the event descriptor where applicable, or may be received later, e.g. in response to sending an indicator of an appropriate user input to the event monitoring server 130. The event monitoring client application 122 may display the one or more properties of the one or more systems. The properties of the one or more systems may be displayed as part of the GUI, and may be displayed by any of the means by which the plurality of properties of the suspicious system event may be displayed.

The event monitoring client application 122 may further receive one or more vulnerability descriptors. The one or more vulnerability descriptors include properties of one or more known security vulnerabilities of the one or more systems. For example, the one or more properties of the one or more known security vulnerabilities may include any number or combination of: a name of a security vulnerability; application(s) associated with the security vulnerability; application versions associated with the vulnerability; operating systems associated with the vulnerability; operating system versions associated with the vulnerability; a threat level for the vulnerability; a description of the vulnerability; details of malware known to exploit the vulnerability; names of actors known to target the vulnerability; and details of actions that may be taken to address the vulnerability. These one or more vulnerability descriptors may be received with the plurality of properties, and the event descriptor where applicable, or may be received later, e.g. with the system descriptor or in response to sending an indicator of an appropriate user input to the event monitoring server 130. The event monitoring client application 122 may display the one or more properties of the one or more security vulnerabilities. The properties of the one or more security vulnerabilities may be displayed as part of the GUI, and may be displayed by any of the means by which the plurality of properties of the suspicious system event may be displayed.

The one or more vulnerability descriptors may be associated with one or more other system descriptors. The one or more other system descriptors may be system descriptors for one or more other system(s) having the same one or more security vulnerabilities as the one or more systems on which the suspicious system event occurred. The association of the one or more vulnerability descriptors with the one or more other system descriptors may facilitate identifying these one or more other systems. Identifying these one or more other system(s) facilitates remedying and/or mitigating the one or more security vulnerabilities on these other one or more system(s) (in addition to the one or more system(s) on which the suspicious system event occurred). The remedying and/or mitigating of the one or more security vulnerabilities on the one or more other system(s) may prevent or reduce occurrences of suspicious system events on the one or more other system(s).

The event monitoring client application 122 may further receive, from the event monitoring server 130, a plurality of properties associated with a second suspicious system event. The plurality of properties associated with the second suspicious system event may be received via any of the mechanism and in any of the forms by which the plurality of properties associated with the first suspicious system event may be received. An event descriptor comprising the plurality of properties associated with the second suspicious system event may be received. System descriptors and/or vulnerability indicators associated with the second suspicious system event may also be received. The event monitoring server 130 may have determined that the second suspicious event has occurred based on one or more new event detectors. The one or more new event detectors may have been generated by the event monitoring server 130 based on one or more selection indicators sent to the server by the event monitoring client application with reference to an earlier suspicious event notification, for example. The event monitoring client application may display the plurality of properties associated with the second suspicious system event, and may display these properties using any of the mechanisms referred to in relation to displaying the plurality of properties associated with the first suspicious system event.

The event monitoring server 130 may include one or more processors (e.g. CPUs), a network interface, and memory. The processor(s) is configured to execute computer instructions that are stored in one or more computer-readable media, for example, the memory of the respective server. The event monitoring server 130 includes a network interface that is configured to allow the server to transmit and receive data in one or more networks, e.g. a network connecting the event monitoring server 130, the monitored systems 140, the security monitoring application server 150 and the database 160. The network interface may include one or more network interface cards (NICs). The memory of the server stores its respective data and instructions.

The event monitoring server 130 may include an event monitoring server application 132. The event monitoring server application 132 may be implemented as one or more computer programs, or as one or more aspects or components of one or more computer programs.

The event monitoring server application 132 may be configured to: receive a plurality of system event records; process the plurality of system event records using a set of event detectors to determine that a suspicious system event has occurred; send, to the client computing device 120, a plurality of properties associated with the suspicious system event; receive, from the client device, a selection indicator indicating a selected one or more properties of the plurality of properties; generate one or more new event detectors based on the selected one or more properties; and add the one or more new event detectors to the set of the event detectors.

The event monitoring server application 132 may receive the plurality of system event records from the monitored systems 140 and/or from the security monitoring application server 150. The system event records may include system log records and/or records generated by a security monitoring application 152. The system event records may be received using any suitable mechanism, e.g. via a remote service call, a representational state transfer (REST) operation, an internal networking protocol; a file sharing protocol or service; and/or memory or persistent storage shared between the event monitoring server 130 and either or both of the monitored systems and the security monitoring application server 150. The system event records may be received in any suitable form. For example, the system event records may be received as a series of strings, XML, formatted data, a JSON object, a file and/or a platform specific markup or binary format.

Examples of system log records include Windows® event log records and Linux log file records.

Windows® event log records may be stored in one or more of a Windows® Application log, a Windows® Security log, a Windows® Setup log, a Windows® System log, a Windows® Forwarded Events log, and application and/or service specific logs. Windows® event log records may be stored and/or output in the Windows XML event log (EVTX) format, which is a binary XML format, or in a format representing the data contained therein, e.g. the data in a human-readable XML format. Windows® event log records include one or more of the following properties: keywords, user, operational code, log (e.g. log text and/or markup), computer, process ID, thread ID, processor ID, session ID, kernel time, user time, processor time, correlation ID, relative correlation ID, and event source name.

Linux log records may be in a standardized format specified by the Internet Engineering Task Force (IETF) RFC 5424 standard or the IETF RFC 3164 format. Linux log file records may be stored in one or more log files. The one or more log files may be stored in a log directory of a Linux system, e.g. a '/var/log' directory. Examples of log files include: messages, syslog, auth.log, kern.log and cron. Linux log file records include one or more of the following properties: a timestamp, a hostname, an IP address, a facility code, a severity level, a message component, a tag, a version number, an application name, a process identifier, and a message identifier.

The event monitoring server application 132 may process the plurality of system event records using a set of system event detectors to determine that a suspicious system event has occurred.

The set of event detectors may be contained and/or accessed using any suitable data structure, e.g. an array, a list object, a set object, a linked list, a hash table, or database entries. Where the set of event detectors is implemented using a number of database entries, the set of event detectors may be the event detectors 164 stored on the database 160. The set of event detectors may be persistently stored in the database 160 and the set, or a subset thereof, may be transformed to be contained and/or accessible in an in-memory data structure when loaded into temporary storage, e.g. the main memory of the event monitoring server 130.

Each of the event detectors may be represented using any suitable format, e.g. as one or more strings, one or more database entries, one or more markup language snippets or files, one or more programming language snippets or files and/or one or more computer executable instructions. An event detector may be persistently stored in one format and loaded into temporary memory and/or executed in another format. For example, the event detector may be persistently stored as a markup language snippet in a markup language file and, before execution, transformed into a code snippet and/or computer executable instructions.

An event detector may determine the occurrence of the suspicious system event based on one or more properties of the system event. The event detector may use one or more rules, examples of which are described below, these one or more rules may be provided by the user 110 or automatically determined by the server 130. The event detector may use a property comparison rule. For example, the event detector may compare a property value specified by the rule to one or more properties of one or more system event record(s) or to property values that can be obtained using the one or more system event record(s), e.g. an operating system version that may be looked up based on a system hostname specified in the record(s). The event detector may use a property combination rule. For example, the event detector may compare several specified property values to properties of one or more system event record(s) and/or properties obtained using the one or more system event record(s), and may determine that a suspicious system event has occurred if the properties match all or a sufficient number of the specified property values. The event detector may use a property alternative rule. For example, the event detector may compare a plurality of property values specified by the rule to one or more properties of one or more system event record(s) or to property values that can be obtained using the one or more system event record(s), and determine that a suspicious event has occurred if the relevant property or properties match at least one of the plurality of specified property values. Matching may refer to an exact match between the property or properties and a specified property value, or matching may include approximate matches, e.g. matches within a given edit distance or a match defined according to a regular expression. These examples should be considered to be non-limiting and an event detector may use any rule which can be performed by one or more processors and uses one or more system event records to determine an occurrence of a suspicious system event. Alternatively or in addition to the rules described above, the event detector may perform any number of operations performable using one or more processors, e.g. logical operations, counting operations and/or arithmetic operations. The event detector may also or additionally use one or more machine learned models to detect suspicious system events, e.g. one or more trained neural networks and/or one or more learned decision trees may be used.

The event monitoring server application 132 may process each of the plurality of system event records using each of the set of event detectors, e.g., each event detector may be applied to each system event record. Alternatively, the event monitoring server application 132 may determine which event detectors are applicable to which system event records, and process each system event record using applicable event detectors. For example, an event detector may be applicable to system event records having a given property and inapplicable to other system event records. One or more event detectors may be applicable to groups of system event records, e.g., subsets of the plurality of system event records containing multiple records. Such event detectors may be applied to groups of system event records. The event monitoring server application 132 may appropriately group the system event records for processing using such event detectors. The event monitoring server application 132 may determine a suspicious system event has occurred when at least one application of at least one event detector to at least one, or at least one group, indicates an occurrence of a suspicious system event, e.g., where the event detector uses a property comparison match rule, there is a match between properties of a system event record and the property value specified by the rule.

The event monitoring server application 132 may send, to the client device 120, a plurality of properties associated with the suspicious system event. The event monitoring server application 132 may send the plurality of properties in response to a determination that a suspicious system event has occurred. The plurality of properties may be sent using any suitable mechanism, e.g. via a remote service call, a representational state transfer (REST) operation, an internal networking protocol; and/or memory or persistent storage shared between the event monitoring server 130 and the client. The plurality of properties may be sent in any suitable form. For example, the plurality of properties may be sent as a series of strings, XML formatted data, a JSON object, a file and/or a platform specific markup or binary format.

The sent plurality of properties may be comprised in an event descriptor, which is received by the client computing device 120. The event descriptor may structure these properties in such a way that they are easy to process by the client computing device 120, e.g. by the event monitoring client application 122. The event descriptor may structure these properties such that they are displayable by the event monitoring client application 122 in a format which is easily understandable by users.

The plurality of properties may include any number of: an identifier for the suspicious system event; an indicator or indicator of compromise for the suspicious system event; a time at which the suspicious system event occurred; details of a system on which the suspicious system event occurred, e.g. hostname, a network address, operating system details, etc.; details of one or more security vulnerabilities associated with one or more system(s) on which the suspicious system event occurred; details of a network and/or network zone within which the suspicious system event occurred; details of a remote service call associated with a suspicious system event; a number of times a similar or identical suspicious system event has occurred; details of an actor known to be, or likely to be, responsible for the suspicious system event, e.g. the actor name and/or type; details of an application causing the suspicious system event; and/or details of malware responsible for or otherwise related to the suspicious system event.

The event monitoring server application 132 may receive, from the client device, a selection indicator indicating a selected one or more properties of the plurality of properties. The selection indicator indicating the selected one or more properties may be received from the client device 120 using any suitable mechanism, e.g. via a remote service call, a representational state transfer (REST) operation, an internal networking protocol; and/or memory or persistent storage shared between the event monitoring server 130 and the client 120. The selection indicator may take any suitable form, e.g. the selection indicator may be one or more strings, XML formatted data, a JSON object, a file and/or a platform specific markup or binary format. In addition to indicating the selected one or more properties, the selection indicator may also include details of specified variations of the selected one or more properties and/or details of rules based on the one or more properties.

The event monitoring server application 132 may generate one or more new event detectors based on the selected one or more properties.

Each of the one or more new event detectors may be represented using any suitable format, e.g. as one or more strings, one or more database entries, one or more markup language snippets or files, one or more programming language snippets or files and/or one or more computer executable instructions. Each of the one or more new event detectors may be persistently stored in one format and loaded into temporary memory and/or executed in another format. For example, the one or more new event detectors may be persistently stored as a markup language snippet in a markup language file and, before execution, transformed into a code snippet and/or computer executable instructions.

The one or more new event detectors may determine the occurrence of the suspicious system event based on one or more properties of the system event records or properties associated therewith. The one or more new event detectors may be any of the types, use any of the rules and perform any of the operations previously described.

A new event detector may be generated based on the selected one or more properties by generating an event detector that determines that a suspicious event has occurred where one or more system event record have properties with values matching the selected one or more properties. Matching may refer to exact matching or may include approximate matching, e.g. within a given edit distance or variations defined using a regular expression. Where there are multiple selected properties, a property combination rule or a property alternative rule may be generated. Whether a property combination rule or a property alternative rule is generated may be determined based on user-specified information, e.g. inputted using the event monitoring client application, which is received as part of the selection indicator. Logic and/or information about operations to be performed may also be included in user-specified information received as part of the selection indicator and the new event detector generated as to perform the indicated logic and/or operations. Where the new event detector uses a machine learning model, e.g. a neural network or a decision tree model, the selected one or more properties and/or the user-specified information may be used to train, or otherwise adapt, the machine learning model.

The event monitoring server application may add the one or more new event detectors to the set of event detectors. The one or more new event detectors may then be used to determine occurrences of suspicious system events. The one or more new event detectors may be added to the set by adding them to the data structure(s) used to implement the set of event detectors. For example, where the set is implemented as a number of database entries, a new database entry may be added to the database for each of the one or more new event detectors. Where the set is implemented as an in-memory data structure, the new event detector(s), or references to the new event detector(s), may be added to the in-memory data structure. For example, references to each of the new event detector(s) may be added to a linked list representing the set of event detectors.

The event monitoring server application 132 may further send one or more system descriptors to the client device 120. The one or more system descriptors include one or more properties of one or more system(s) on which the suspicious system event occurred. For example, the one or more properties of the system(s) may be any number or combination of: a system hostname; a system IP address; a system MAC address; a system network zone; an operating system name; an operating system version; a date and/or time of a system update; and a list of applications installed on the system. These one or more system descriptors may be sent with the plurality of properties, and the event descriptor where applicable, or may be sent later, e.g. in response to receiving an indicator of an appropriate user input from the event monitoring client application 122. The system descriptor(s) may be derived based on information in the system event records, obtained from the monitored system(s) 140, obtained from the security monitoring server 150, stored in the database 160 and/or received from external servers.

The event monitoring server application 132 may further send one or more vulnerability descriptors. The one or more vulnerability descriptors include properties of one or more known security vulnerabilities of the one or more systems. For example, the one or more properties of the one or more known security vulnerabilities may include any number or combination of: a name of a security vulnerability; application(s) associated with the security vulnerability; application versions associated with the vulnerability; operating systems associated with the vulnerability; operating system versions associated with the vulnerability; a threat level for the vulnerability; a description of the vulnerability; details of malware known to exploit the vulnerability; names of actors known to target the vulnerability; and details of actions that may be taken to address the vulnerability. These one or more vulnerability descriptors may be sent with the plurality of properties, and the event descriptor where applicable, or may be sent later, e.g. with the system descriptor or in response to receiving an indicator of an appropriate user input from the event monitoring client application. A plurality of vulnerability descriptors 166 may be stored on the database 160 and the relevant one or more vulnerability descriptors retrieved from the database, e.g. using a lookup based on the operating system name and version of the one or more systems. The one or more vulnerability descriptors may also be derived based on information in the system event records, obtained from the monitored system(s) 140, obtained from the security monitoring server 150, stored in the database 160, e.g. proto-vulnerability descriptors that require further transformation, and/or received from external servers.

The one or more vulnerability descriptors may be associated with one or more other system descriptors. The one or more other system descriptors may be system descriptors for one or more other system(s) having the same one or more security vulnerabilities as the one or more systems on which the suspicious system event occurred. The association of the one or more vulnerability descriptors with the one or more other system descriptors may facilitate identifying these one or more other systems. Identifying these one or more other system(s) facilitates remedying and/or mitigating the one or more security vulnerabilities on these other one or more system(s) (in addition to the one or more system(s) on which the suspicious system event occurred). The remedying and/or mitigating of the one or more security vulnerabilities on the one or more other system(s) may prevent or reduce occurrences of suspicious system events on the one or more other system(s).

The event monitoring server application may further receive a second plurality of system event records. The second plurality of system event records may be received in any of the forms and by any of methods by which the first plurality of system event records may be received. The event monitoring server may determine a second one or more system event records of the second plurality of system event records to indicate that a second suspicious event has occurred. The determination may be based on the second one or more new suspicious event detectors. The determination may occur as part of a processing of the second plurality of system event records by the updated set of event detectors.

The event monitoring server application 132 may further send, to the event monitoring client 130, a plurality of properties associated with the second suspicious system event. The plurality of properties associated with the second suspicious system event may be sent via any of the mechanism and in any of the forms by which the plurality of properties associated with the first suspicious system event may be sent. An event descriptor comprising the plurality of properties associated with the second suspicious system event may be sent. System descriptors and/or vulnerability indicators associated with the second suspicious system event may also be sent.

Each of the one or more monitored systems 140 may include one or more processors (e.g. CPUs), a network interface, and memory. The processor(s) is configured to execute computer instructions that are stored in one or more computer-readable media, for example, the memory of the respective monitored system. Each of the one or more monitored systems includes a network interface that is configured to allow the monitored system to transmit and receive data in one or more networks, e.g. a network connecting the monitored system with the event detection server 130 and/or with other monitored systems. The network interface may include one or more network interface cards (NICs). The memory of each monitored system stores its respective data and instructions.

The one or more monitored systems 140 may be a plurality of monitored systems 140 in a network of a sizable organization, e.g. an organization having more than 50 systems. Examples of such organizations include enterprises; governments, and departments or organizations thereof; and non-governmental organizations. The one or more monitored systems 140 may be monitored systems probable to be threatened by malicious actors. These malicious actors may be internal or external malicious actors with permission to access one or more of the monitored systems 140. The malicious actors may alternatively or additionally be internal or external malicious actors without access to one or more of the monitored systems 140.

A security monitoring application server 150 may include a security monitoring application 152. The security monitoring application 152 may monitor the one or more monitored systems 140, or a subset thereof. The security monitoring application 152 may monitor activities occurring on the monitored systems; provide properties of the monitored systems; and provide information about data on said systems. The security monitoring application 152 may output, or otherwise generate, system event records to be received by the event monitoring server 130. Examples of security monitoring applications include System Center Operations Manager (SCOM); Nagios; Rudder; and appropriately configured instances of Splunk and/or Kibana. The security monitoring application 152 may be a network monitoring application. Examples of network monitoring applications include Zeek, Siricata and Snort. The security monitoring application 152 may be an endpoint monitoring application. Examples of endpoint monitoring applications include Endgame, Carbonblack and CrowdStrike. The security monitoring application 152 may be an advanced threat protection (ATP) application, e.g. Microsoft Office 365 Advanced Threat Protection. The security monitoring application 152 may be an antivirus application, e.g. AVG Antivirus, BitDefender Security, ClamAV, Microsoft Windows Defender and Sophos Anti-Virus.

The database 160 may include a database server module 162 for storing and retrieving data including event detectors 164 and vulnerability descriptors 166. The database 160 may be implemented as a single server computing device or as multiple server computing devices arranged in a distributed or clustered computing arrangement. Each such server computing device may be composed of hardware components like those of computing device 500 described below with respect to FIG. 5.

The database 160 may include one or more processors (e.g., CPUs), a network interface, and memory. The processor(s) may be configured to execute computer instructions that are stored in one or more computer-readable media, for example, the memory of the database 160. The database 160 may include a network interface that is configured to allow the database 160 to transmit and receive data in one or more networks. The network interface may include one or more network interface cards (NICs). The memory of the database 160 may store data or instructions. The instructions stored in the memory may include the database server module 162.

Suspicious Event Detection Method

Figure 2:
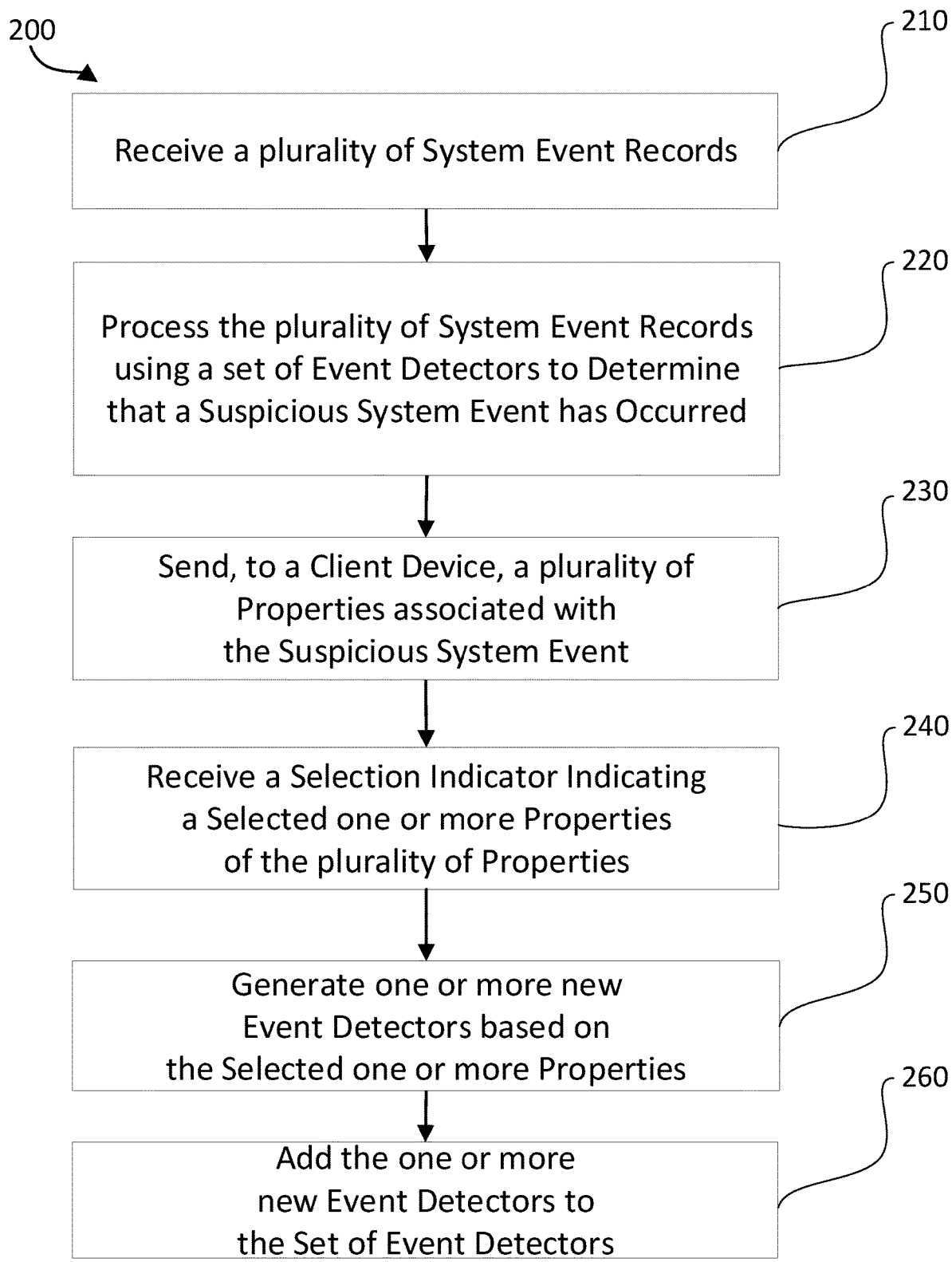
FIG. 2 is a flow diagram illustrating an example method for detecting suspicious system events, in accordance with example embodiments.

FIG. 2 is a flowchart illustrating an example method 200 for detecting suspicious system events. The method 200 is performed by computer-readable instructions, e.g. software, for execution by one or more processors of one or more computing devices (e.g., the computing device 500 of FIG. 5). In one embodiment, the one or more computing devices are one or more event monitoring servers 130. The method 200 may be performed using an event monitoring software application. The event monitoring software application may be any number of and/or any combination of sequences of instructions, interpretable code, loadable modules, dynamic link libraries and/or computer programs. The event monitoring software application may be implemented on a single computing device or distributed across multiple computing devices.

At step 210, a plurality of system event records are received. The plurality of system event records may be received from one or more monitored systems and/or from one or more security monitoring applications. The system event records may include system log records and/or records generated by the one or more security monitoring application. The system event records may be received using any suitable mechanism, e.g. via a remote service call, a representational state transfer (REST) operation, an internal networking protocol; a file sharing protocol or service; and/or memory or persistent storage shared between the software implementing the method 200, and the monitored systems and/or the security monitoring application. The system event records may be received in any suitable form. For example, the system event records may be received as a series of strings, XML formatted data, a JSON object, a file and/or a platform specific markup or binary format.

Examples of system log records include Windows® event log records and Linux log file records.

Windows® event log records may be stored in one or more of a Windows® Application log, a Windows® Security log, a Windows® Setup log, a Windows® System log, a Windows® Forwarded Events log, and application and/or service specific logs. Windows® event log records may be stored and/or output in the Windows XML event log (EVTX) format, which is a binary XML format, or in a format representing the data contained therein, e.g. the data in a human-readable XML format. Windows® event log records include one or more of the following properties: keywords, user, operational code, log (e.g. log text and/or markup), computer, process ID, thread ID, processor ID, session ID, kernel time, user time, processor time, correlation ID, relative correlation ID, and event source name.

Linux log records may be in a standardized format specified by the Internet Engineering Task Force (IETF) RFC 5424 standard or the IETF RFC 3164 format. Linux log file records may be stored in one or more log files. The one or more log files may be stored in a log directory of a Linux system, e.g. a '/var/log' directory. Examples of log files include: messages, syslog, auth.log, kern.log and cron. Linux log file records include one or more of the following properties: a timestamp, a hostname, an IP address, a facility code, a severity level, a message component, a tag, a version number, an application name, a process identifier, and a message identifier.

At step 220, the plurality of system event records are processed using a set of event detectors to determine that a suspicious system event has occurred.

The set of event detectors may be contained and/or accessed using any suitable data structure, e.g. an array, a list object, a set object, a linked list, a hash table, or database entries. Where the set of event detectors is implemented using a number of database entries, the set of event detectors may be stored on a database. The set of event detectors may be persistently stored on the database and the set, or a subset thereof, may be transformed to be contained and/or accessible in an in-memory data structure when loaded into temporary storage.

Each of the event detectors may be represented using any suitable format, e.g. as one or more strings, one or more database entries, one or more markup language snippets or files, one or more programming language snippets or files and/or one or more computer executable instructions. An event detector may be persistently stored in one format and loaded into temporary memory and/or executed in another format. For example, the event detector may be persistently stored as a markup language snippet in a markup language file and, before execution, transformed into a code snippet and/or computer executable instructions.

An event detector may determine the occurrence of the suspicious system event based on one or more properties of the system event. The event detector may use a property comparison rule. For example, the event detector may compare a property value specified by the rule to one or more properties of one or more system event record(s) or to property values that can be obtained using the one or more system event record(s), e.g. an operating system version that may be looked up based on a system hostname specified in the record(s). The event detector may use a property combination rule. For example, the event detector may compare several specified property values to properties of one or more system event record(s) and/or properties obtained using the one or more system event record(s), and may determine that a suspicious system event has occurred if the properties match all or a sufficient number of the specified property values. The event detector may use a property alternative rule. For example, the event detector may compare a plurality of property values specified by the rule to one or more properties of one or more system event record(s) or to property values that can be obtained using the one or more system event record(s), and determine that a suspicious event has occurred if the relevant property or properties match at least one of the plurality of specified property values. Matching may refer to an exact match between the property or properties and a specified property value, or matching may include approximate matches, e.g. matches within a given edit distance or a match defined according to a regular expression. These examples should be considered to be non-limiting and an event detector may use any rule which can be performed by one or more processors and uses one or more system event records to determine an occurrence of a suspicious system event. Alternatively or in addition to the rules described above, the event detector may perform any number of operations performable using one or more processors, e.g. logical operations, counting operations and/or arithmetic operations. The event detector may also or additionally use one or more machine learned models to detect suspicious system events, e.g. one or more trained neural networks and/or one or more learned decision trees may be used.

Each of the plurality of system event records may be processed using each of the set of event detectors, e.g., each event detector may be applied to each system event record. Alternatively, which event detectors are applicable to which system event records (and/or group of system event records) may be determined, and each system event record processed using applicable event detectors. For example, an event detector may be applicable to system event records having a given property and inapplicable to other system event records. One or more event detectors may be applicable to groups of system event records, e.g., subsets of the plurality of system event records containing multiple records. Such rules may be applied to groups of system event records. The system event records may be appropriately grouped for processing using such rules. A suspicious system event may be determined to have occurred when at least one application of at least one event detector to at least one, or at least one group, indicates an occurrence of a suspicious system event, e.g. where the event detector uses a property comparison match rule, there is a match between properties of a system event record and the property value specified by the rule.

At step 230, a plurality of properties associated with the suspicious system event are sent to a client device. The plurality of properties may be sent in response to a determination that a suspicious system event has occurred. The plurality of properties may be sent using any suitable mechanism, e.g. via a remote service call, a representational state transfer (REST) operation, an internal networking protocol; and/or memory or persistent storage shared between the event monitoring server 130 and the client. The plurality of properties may be sent in any suitable form. For example, the plurality of properties may be sent as a series of strings, XML formatted data, a JSON object, a file and/or a platform specific markup or binary format.

The sent plurality of properties may be comprised in an event descriptor. The event descriptor may be received by the client device. The event descriptor may structure these properties in such a way that they are easy to process by the client device, e.g. by a suitable application of the client device, such as a web application shown on a browser of the client device. The event descriptor may structure these properties such that they are displayable in a format which is easily understandable by users.

The plurality of properties may include any number of: an identifier for the suspicious system event; a time at which the suspicious system event occurred; details of a system on which the suspicious system event occurred, e.g. hostname, a network address, operating system details, etc.; details of one or more security vulnerabilities associated with one or more system(s) on which the suspicious system event occurred; details of a network and/or network zone within which the suspicious system event occurred; details of a remote service call associated with a suspicious system event; a number of times a similar or identical suspicious system event has occurred; details of an actor known to be, or likely to be, responsible for the suspicious system event, e.g. the actor name and/or type; details of an application causing the suspicious system event; and/or details of malware responsible for or otherwise related to the suspicious system event.

At step 240, a selection indicator indicating a selected one or more properties of the plurality of properties are received. The selection indicator may be received from the client device. The selection indicator indicating the selected one or more properties may be received using any suitable mechanism e.g. via a remote service call, a representational state transfer (REST) operation, an internal networking protocol; a file sharing protocol or service; and/or memory or persistent storage shared between the software implementing the method 200, and the client. The selection indicator may take any suitable form, e.g. the selection indicator may be one or more strings, XML formatted data, a JSON object, a file and/or a platform specific markup or binary format. In addition to indicating the selected one or more properties, the selection indicator may also include details of specified variations of the selected one or more properties and/or details of rules based on the one or more properties.

At step 250, one or more new event detectors are generated based on the selected one or more properties.

Each of the one or more new event detectors may be represented using any suitable format, e.g. as one or more strings, one or more database entries, one or more markup language snippets or files, one or more programming language snippets or files and/or one or more computer executable instructions. Each of the one or more new event detectors may be persistently stored in one format and loaded into temporary memory and/or executed in another format. For example, the one or more new event detectors may be persistently stored as a markup language snippet in a markup language file and, before execution, transformed into a code snippet and/or computer executable instructions.

The one or more new event detectors may determine the occurrence of the suspicious system event based on one or more properties of the system event records or properties associated therewith. The one or more new event detectors may be any of the types, use any of the rules and perform any of the operations previously described.

A new event detector may be generated based on the selected one or more properties by generating an event detector that determines that a suspicious event has occurred where one or more system event record have properties with values matching the selected one or more properties. Matching may refer to exact matching or may include approximate matching, e.g. within a given edit distance or variations defined using a regular expression. Where there are multiple selected properties, a property combination rule or a property alternative rule may be generated. Whether a property combination rule or a property alternative rule is generated may be determined based on user-specified information, e.g. inputted using a client application, which is received as part of the selection indicator. Logic and/or information about operations to be performed may also be included in user-specified information received as part of the selection indicator and the new event detector generated as to perform the indicated logic and/or operations. Where the new event detector uses a machine learning model, e.g. a neural network or a decision tree model, the selected one or more properties and/or the user-specified information may be used to train, or otherwise adapt, the machine learning model.

At step 260, one or more new event detectors are added to the set of event detectors. The one or more new event detectors may then be used to determine occurrences of suspicious system events. The one or more new event detectors may be added to the set by adding them to the data structure(s) used to implement the set of event detectors. For example, where the set is implemented as a number of database entries, a new database entry may be added to the database for each of the one or more new event detectors. Where the set is implemented as an in-memory data structure, the new event detector(s), or references to the new event detector(s), may be added to the in-memory data structure. For example, references to each of the new event detector(s) may be added to a linked list representing the set of event detectors.

One or more system descriptors may be sent to the client device. The one or more system descriptors include one or more properties of one or more system(s) on which the suspicious system event occurred. For example, the one or more properties of the system(s) may be any number or combination of: a system hostname; a system IP address; a system MAC address; a system network zone; an operating system name; an operating system version; a date and/or time of a system update; and a list of applications installed on the system. These one or more system descriptors may be sent with the plurality of properties, and the event descriptor where applicable, or may be sent later, e.g. in response to receiving an indicator of an appropriate user input from the client device. The system descriptor(s) may be derived based on information in the system event records, obtained from the monitored system(s), obtained from a security monitoring application, stored in a database and/or received from external servers.

One or more vulnerability descriptors may be sent to the client device. The one or more vulnerability descriptors include properties of one or more known security vulnerabilities of the one or more systems. For example, the one or more properties of the one or more known security vulnerabilities may include any number or combination of: a name of a security vulnerability; application(s) associated with the security vulnerability; application versions associated with the vulnerability; operating systems associated with the vulnerability; operating system versions associated with the vulnerability; a threat level for the vulnerability; a description of the vulnerability; details of malware known to exploit the vulnerability; names of actors known to target the vulnerability; and details of actions that may be taken to address the vulnerability. These one or more vulnerability descriptors may be sent with the plurality of properties, and the event descriptor where applicable, or may be sent later, e.g. with the system descriptor or in response to receiving an indicator of an appropriate user input from the event monitoring client application. A plurality of vulnerability descriptors may be stored on a database and the relevant one or more vulnerability descriptors retrieved from the database, e.g. using a lookup based on the operating system name and version of the one or more systems. The one or more vulnerability descriptors may also be derived based on information in the system event records, obtained from the monitored system(s), obtained from a security monitoring application, stored in a database, e.g. proto-vulnerability descriptors that require further transformation, and/or received from external servers.

The one or more vulnerability descriptors may be associated with one or more other system descriptors. The one or more other system descriptors may be system descriptors for one or more other system(s) having the same one or more security vulnerabilities as the one or more systems on which the suspicious system event occurred. The association of the one or more vulnerability descriptors with the one or more other system descriptors may facilitate identifying these one or more other systems. Identifying these one or more other system(s) facilitates remedying and/or mitigating the one or more security vulnerabilities on these other one or more system(s) (in addition to the one or more system(s) on which the suspicious system event occurred). The remedying and/or mitigating of the one or more security vulnerabilities on the one or more other system(s) may prevent or reduce occurrences of suspicious system events on the one or more other system(s).

A second plurality of system event records may be received. The second plurality of system event records may be received in any of the forms and by any of methods by which the first plurality of system event records may be received. The event monitoring server may determine a second one or more system event records of the second plurality of system event records to indicate that a second suspicious event has occurred. The determination may be based on the second one or more new suspicious event detectors. The determination may occur as part of a processing of the second plurality of system event records by the updated set of event detectors. A plurality of properties associated with the suspicious system event may be sent to the client device. The plurality of properties associated with the second suspicious system event may be sent via any of the mechanism and in any of the forms by which the plurality of properties associated with the first suspicious system event may be sent. An event descriptor comprising the plurality of properties associated with the second suspicious system event may be sent. System descriptors and/or vulnerability indicators associated with the second suspicious system event may also be sent.

The described method may be iterated several times with a new received plurality of system event records processed using the updated set of event detectors, e.g., the set of event detectors after the one or more new event detectors have been added.

Property Selection Method

Figure 3:
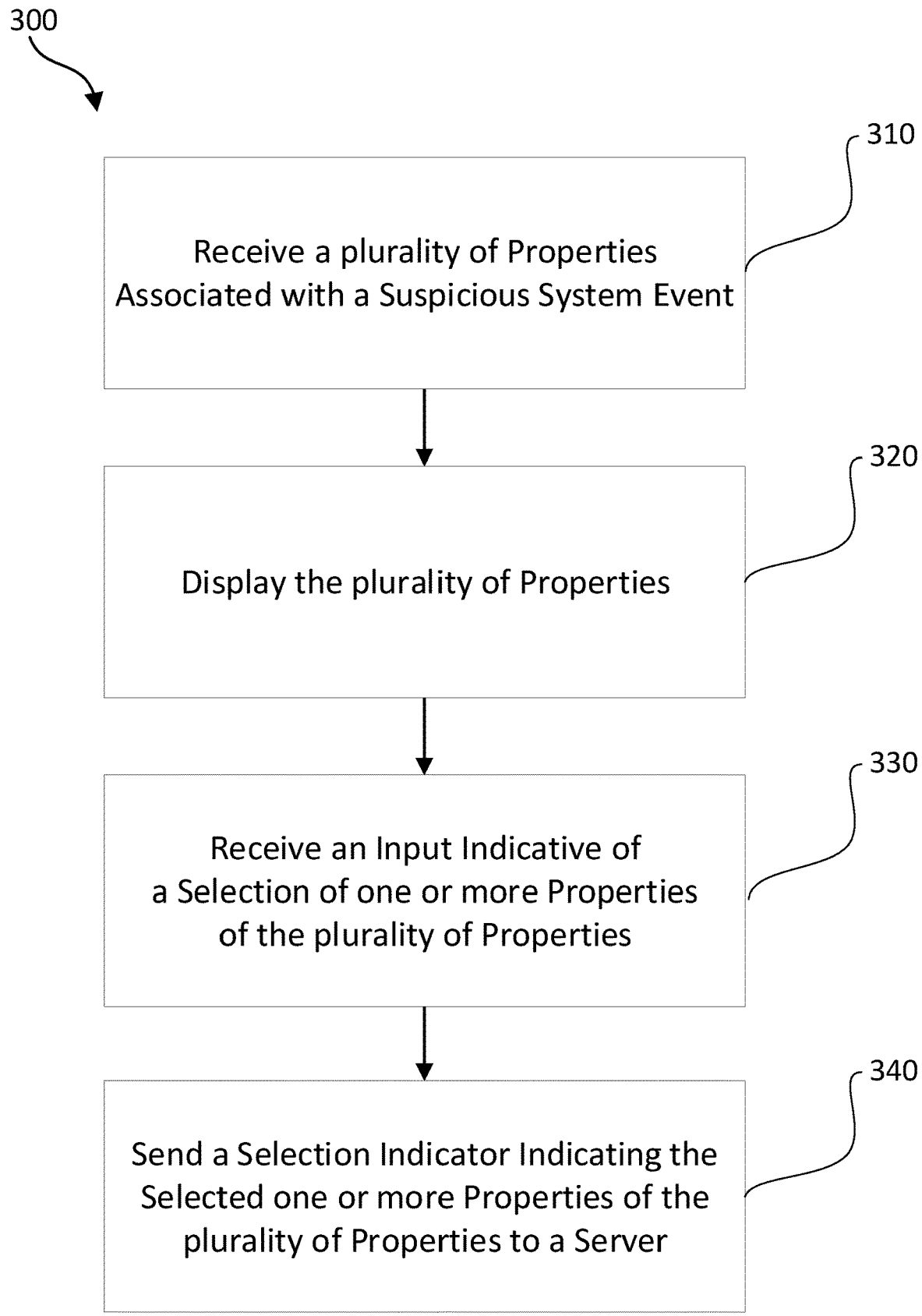
FIG. 3 is a flow diagram illustrating an example method for selection of one or more properties associated with a suspicious system event, in accordance with example embodiments.

FIG. 3 is a flow diagram illustrating an example method for selection of one or more properties associated with a suspicious system event. The method 300 is performed by computer-readable instructions, e.g. software, for execution by one or more processors of one or more computing devices (e.g., the computing device 500 of FIG. 5). In one embodiment, the one or more computing devices are one or more event monitoring client devices 120. The method 300 may be performed using an event monitoring client application. The event monitoring client application may be any number of and/or any combination of sequences of instructions, interpretable code, loadable modules, dynamic link libraries and/or computer programs.

At step 310, the plurality of properties associated with the suspicious system event are received. The plurality of properties may be received from a server. The plurality of properties may be received using any suitable mechanism, e.g. via a remote service call, a representational state transfer (REST) operation, an internal networking protocol; and/or memory or persistent storage shared between the client 120 and the server. The plurality of properties may be received in any suitable form. For example, the plurality of properties may be received as a series of strings, XML, formatted data, a JSON object, a file and/or a platform specific markup or binary format.

The plurality of properties may include any number of: an identifier for the suspicious system event; an indicator or indicator of compromise for the suspicious system event; a time at which the suspicious system event occurred; details of a system on which the suspicious system event occurred, e.g. hostname, a network address, operating system details, etc.; details of one or more security vulnerabilities associated with one or more system(s) on which the suspicious system event occurred; details of a network and/or network zone within which the suspicious system event occurred; details of a remote service call associated with a suspicious system event; a number of times a similar or identical suspicious system event has occurred; details of an actor known to be, or likely to be, responsible for the suspicious system event, e.g. the actor name and/or type; details of an application causing the suspicious system event; and/or details of malware responsible for or otherwise related to the suspicious system event.

The plurality of properties may be received in an event descriptor. The event descriptor may structure these properties in such a way that they are understandable by the user, and/or practicable to be displayed to the user in an understandable way in a graphical user interface.

At step 320, the plurality of properties are displayed. The plurality of properties may be displayed on a display as part of the GUI which may take any of the forms described. The plurality of properties may be displayed on the display simultaneously or using user interface elements whereby a user provides inputs to access one or more of the plurality of properties. For example, the user may scroll down or scroll across to access one or more of the plurality of properties and/or may click a user interface element, e.g. an expand button, to access one or more of the plurality of properties. Where an event descriptor comprising the plurality of properties is received, the plurality of properties may be displayed in a format corresponding to and/or based on the structure of the event descriptor.

At step 330, an input indicative of a selection of one or more properties of the pluralities is received. The input may be received in any suitable form. For example, the input may be a pointer input, e.g. a mouse click or tap, on one or more user interface elements displaying the one or more properties of the plurality of properties. Alternatively or additionally, the input may be received using one or more keyboard presses, e.g. the user may highlight the one or more properties using the arrow keys and press enter to confirm that they are the properties that they wish to select. In addition to providing an input indicative of a selection, the user may be able to provide one or more related inputs. For example, the user may be provided with a dialogue whereby they can specify variations of the selected one or more properties and/or details of rules based on the one or more properties, e.g. rules denoting combinations of properties to be detected.

At step 340, a selection indicator indicating the selected one or more properties is sent to the server. The selection indicator may be sent using any suitable mechanism, e.g. via a remote service call, a representational state transfer (REST) operation, an internal networking protocol; and/or memory or persistent storage shared between the client and the server. The selection indicator may take any suitable form, e.g. the selection indicator may be one or more strings, XML formatted data, a JSON object, a file and/or a platform specific markup or binary format. In addition to indicating the selected one or more properties, the selection indicator may also include details of specified variations of the selected one or more properties and/or details of rules based on the one or more properties.

One or more system descriptors may be received. The one or more system descriptors include one or more properties of one or more system(s) on which the suspicious system event occurred. For example, the one or more properties of the system(s) may be any number or combination of: a system hostname; a system IP address; a system MAC address; a system network zone; an operating system name; an operating system version; a date and/or time of a system update; whether the system is compliant with one or more security requirements, e.g. antivirus requirements and/or identity and access management requirements; whether the system is a virtual machine; and a list of applications installed on the system. These one or more system descriptors may be received with the plurality of properties, and the event descriptor where applicable, or may be received later, e.g. in response to sending an indicator of an appropriate user input to the server. One or more properties of the one or more systems may be displayed. The properties of the one or more systems may be displayed as part of the GUI, and may be displayed by any of the means by which the plurality of properties of the suspicious system event may be displayed.

One or more vulnerability descriptors may be received. The one or more vulnerability descriptors include properties of one or more known security vulnerabilities of the one or more systems. For example, the one or more properties of the one or more known security vulnerabilities may include any number or combination of: a name of a security vulnerability; application(s) associated with the security vulnerability; application versions associated with the vulnerability; operating systems associated with the vulnerability; operating system versions associated with the vulnerability; a threat level for the vulnerability; a description of the vulnerability; details of malware known to exploit the vulnerability; names of actors known to target the vulnerability; and details of actions that may be taken to address the vulnerability. These one or more vulnerability descriptors may be received with the plurality of properties, and the event descriptor where applicable, or may be received later, e.g. with the system descriptor or in response to sending an indicator of an appropriate user input to the event monitoring server 130. The one or more properties of the one or more security vulnerabilities may be displayed. The properties of the one or more security vulnerabilities may be displayed as part of a GUI, and may be displayed by any of the means by which the plurality of properties of the suspicious system event may be displayed.

The one or more vulnerability descriptors may be associated with one or more other system descriptors. The one or more other system descriptors may be system descriptors for one or more other system(s) having the same one or more security vulnerabilities as the one or more systems on which the suspicious system event occurred. The association of the one or more vulnerability descriptors with the one or more other system descriptors may facilitate identifying these one or more other systems. Identifying these one or more other system(s) facilitates remedying and/or mitigating the one or more security vulnerabilities on these other one or more system(s) (in addition to the one or more system(s) on which the suspicious system event occurred). The remedying and/or mitigating of the one or more security vulnerabilities on the one or more other system(s) may prevent or reduce occurrences of suspicious system events on the one or more other system(s).

A plurality of properties associated with a second suspicious system event may be received from the server. The plurality of properties associated with the second suspicious system event may be received via any of the mechanism and in any of the forms by which the plurality of properties associated with the first suspicious system event may be received. An event descriptor comprising the plurality of properties associated with the second suspicious system event may be received. System descriptors and/or vulnerability indicators associated with the second suspicious system event may also be received. The server may have determined that the second suspicious event has occurred based on one or more new event detectors. The one or more new event detectors may have been generated by the server based on the selection indicator sent to the server. The plurality of properties associated with the second suspicious system event may be displayed. These properties may be displayed using any of the mechanisms referred to in relation to displaying the plurality of properties associated with the first suspicious system event.

Suspicious Event Relationships Diagram

Figure 4:
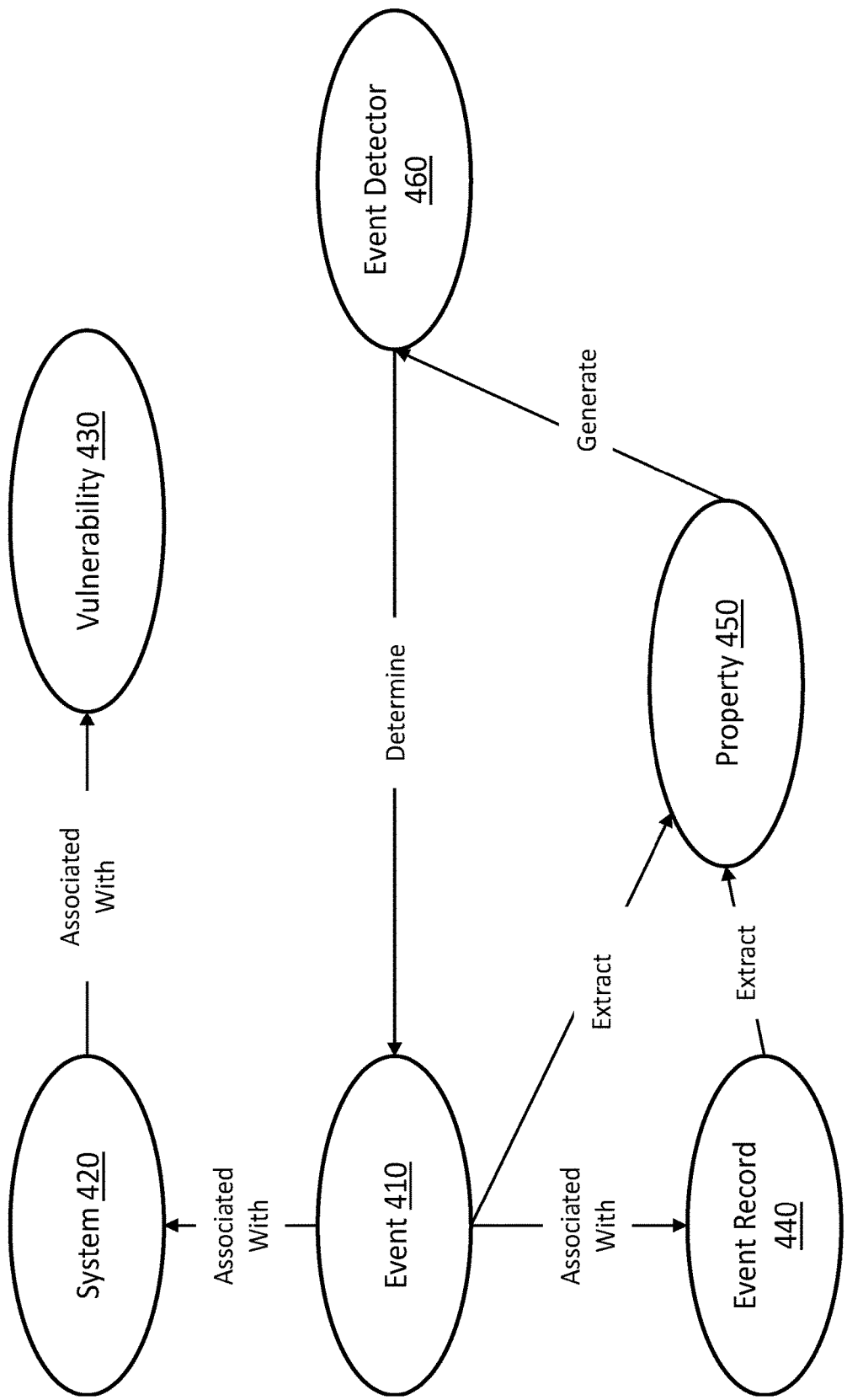
FIG. 4 is a diagrammatic illustration of relationships between suspicious system events and other entities in a suspicious system event detection system.

FIG. 4 is a diagrammatic illustration 400 of relationships between suspicious system events and other entities in a suspicious system event detection system, e.g. system 100 and/or systems implementing the method 200 and/or method 300.

Event entity 410 is a representation of suspicious system event, such as may be identified by the security monitoring application 152 (FIG. 1) based on an existing event detector. The event entity 410 may include a plurality of event properties. The plurality of properties may include any number of: an identifier for the suspicious system event; an indicator or indicator of compromise for the suspicious system event; a time at which the suspicious system event occurred; details of a system on which the suspicious system event occurred, e.g. hostname, a network address, operating system details, etc.; details of one or more security vulnerabilities associated with one or more system(s) on which the suspicious system event occurred; details of a network and/or network zone within which the suspicious system event occurred; details of a remote service call associated with a suspicious system event; a number of times a similar or identical suspicious system event has occurred; details of an actor known to be, or likely to be, responsible for the suspicious system event, e.g. the actor name and/or type; details of an application causing the suspicious system event; and/or details of malware responsible for or otherwise related to the suspicious system event. The event entity 410 may be an event descriptor.

Event entity 410 is associated with one or more system entities 420. Each system entity 420 is a representation of a system. Each system entity 420 may represent a system on which the suspicious system event occurred. Each system entity 420 may include a plurality of properties of each respective system. The plurality of properties of each respective system may be any number or combination of: a system hostname; a system IP address; a system MAC address; a system network zone; an operating system name; an operating system version; a date and/or time of a system update; and a list of applications installed on the system. Each system entity 420 may be a system descriptor.

System entity 420 is associated with one or more vulnerability entities 430. Each vulnerability entity 430 is a representation of a security vulnerability of the respective system. Each vulnerability entity 430 may include a plurality of properties of the respective security vulnerability. The plurality of properties of the respective security vulnerability may include any number or combination of: a name of a security vulnerability; application(s) associated with the security vulnerability; application versions associated with the vulnerability; operating systems associated with the vulnerability; operating system versions associated with the vulnerability; a threat level for the vulnerability; a description of the vulnerability; details of malware known to exploit the vulnerability; names of actors known to target the vulnerability; and details of actions that may be taken to address the vulnerability. Each vulnerability entity may be a vulnerability descriptor.

Event entity 410 is also associated with one or system event records 440. The event record(s) 440 may be the system event record(s) using which it was determined that a suspicious system event had occurred and/or the record(s) used to derive the event entity 410. Each system event record may include a plurality of properties. These properties may be the plurality of properties included in the event entity 410, or may be others of the event properties listed above which were not included in the event entity 410.

One or more property entities 450 are extracted from the event entity 410 and/or the event records 440. Each property entity may be a variable including the property. Each property entity may be an object and/or descriptor including additional information about the property, e.g. the name and/or source of the property.

An event detector 460 may be generated based on one or more property entities 450. For example, the event monitoring server 130 (FIG. 1) may automatically generate a new or updated event detector based on one or more properties of the event entity 410 that are identified by the user and/or automatically identified as relevant to suspicious activity by the event monitoring server 130. The event detector 460 may be used to determine that a suspicious event has occurred and, when such an event has occurred, an event entity 410 may be generated. The event detector 460 may be generated based on the one or more property entities 450 in any of the previously described methods by which an event detector may be generated based on a selected one or more properties. The event detector 460 may take any of the forms, use any of the rules, and be of any of the types previously described.

Computing Device

Figure 5:
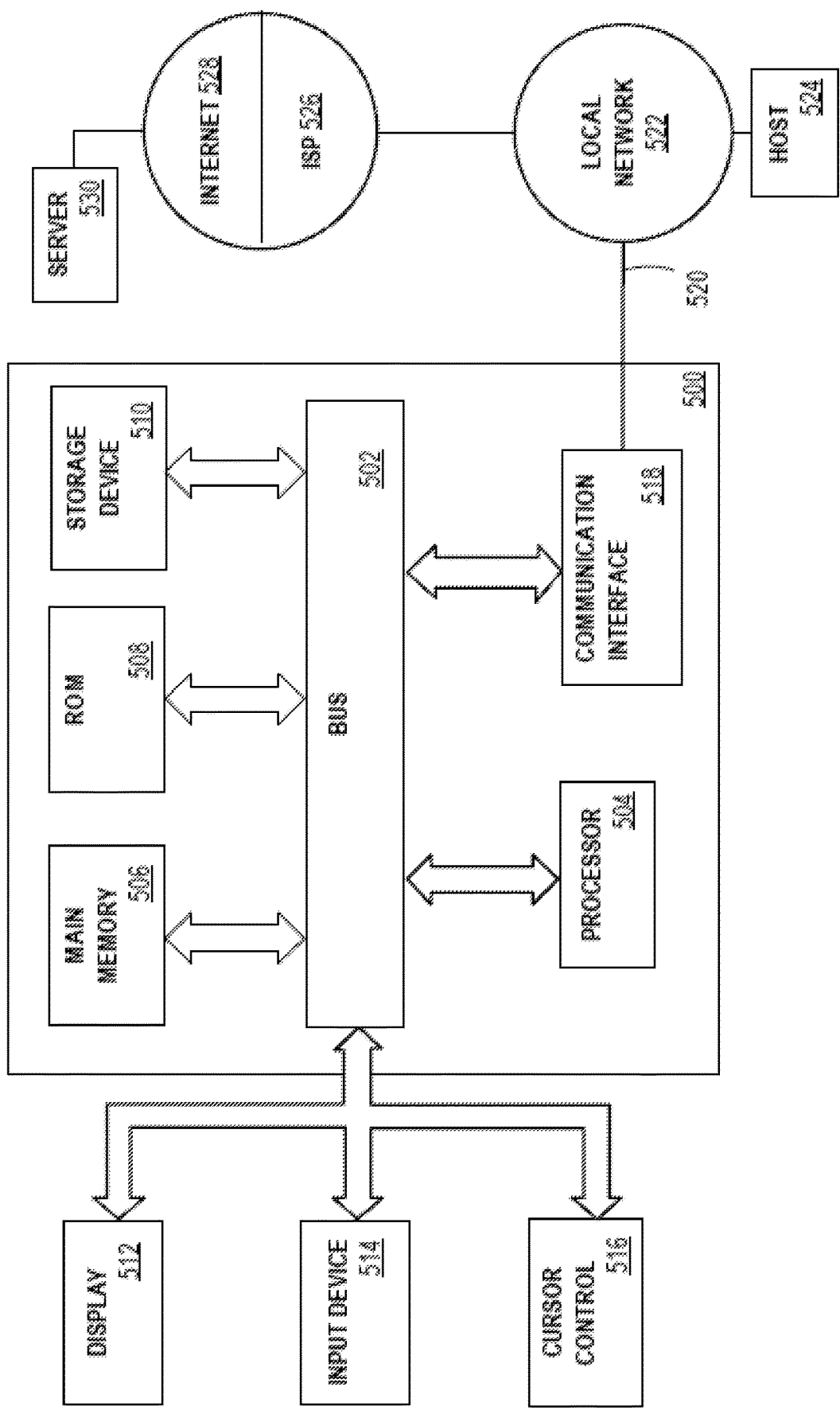
FIG. 5 is a schematic diagram of a computing device in which software-implemented processes of the example embodiments may be embodied.

Referring now to FIG. 5, it is a block diagram that illustrates a computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (e.g., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution The above-described computer hardware is presented for purpose of illustrating the underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Figure 6:
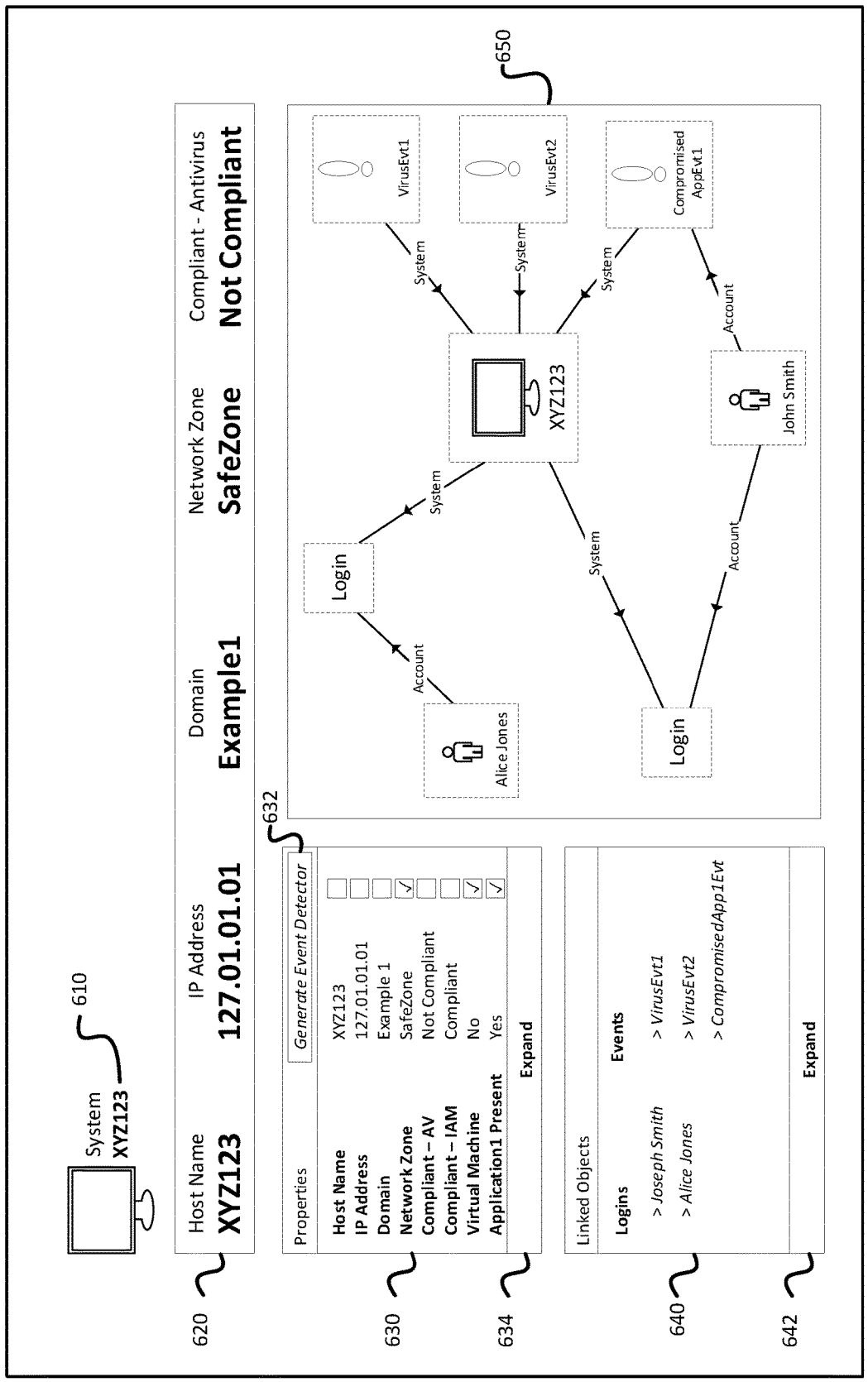
FIG. 6 is a representative drawing, illustrating an example instance of a graphical user interface for an event monitoring client application.

Graphical User Interface FIG. 6 illustrates an example graphical user interface (GUI) 600 for an event monitoring client application, e.g. event monitoring application 122. The GUI 600 may display a plurality of properties associated with a suspicious system event. The plurality of properties may include any of the properties referenced above, e.g. event properties, system properties and vulnerability properties. The GUI 600 may include representations of one or more event descriptors, system descriptors and/or vulnerability descriptors. The GUI 600 may also provide functionality to generate and/or cause the generation of one or more event detectors. The generated one or more event detectors may take any of the forms described above. The provided functionality for generating event detectors may present additional GUI elements (not shown) for configuring the event detector. The additional GUI elements may be displayed as part of the illustrated GUI or may be part of a new tab, window or overlay.

The shown GUI 600 relates to a system and illustrates the properties of the system, users of the system and suspicious system events associated with the system. The illustrated properties of the system may be properties of a system descriptor. While the shown GUI 600 relates to a system, it should be appreciated that similar graphical user interfaces relating to events, vulnerabilities and other entities may also be presented by an event monitoring client application, e.g. event monitoring client application 122. These similar graphical user interfaces may display any number and/or combination of the properties described above in relation to these elements, and the provided event detector generation functionality may also utilize any of these properties. The provided event detector generation functionality may also utilize properties from several of these, e.g. from a system, an event and a vulnerability.

The GUI 600 may include a header element 610. The header element 610 may include an icon indicating the type of entity to which the interface relates, a name of the type of entity and a name of the entity. For example, the shown header element 610 shows a monitor icon to indicate the interface relates to a system, the entity type name 'System', and the name of the system to which the GUI relates 'XYZ123'.

The GUI 600 may also include a summary bar 620 showing several important properties of the entity. By including the several important properties in the summary bar, the visibility of the several important properties may be enhanced. The shown summary bar 620 shows several important properties of the system 'XYZ123'. The several important properties in the shown summary bar 620 are Host Name; IP Address; Domain; Network Zone; and 'Compliant—Antivirus' which indicates whether or not the system is compliant with antivirus requirements, e.g. a requirement that a given antivirus application is installed and has been recently updated.

The GUI 600 may also include a properties interface element 630. The properties interface element may show several properties of the entity. The several properties of the entity may include the several important properties of the entity and one or more other properties of the entity. In the shown properties interface element 630, the several important properties of the system 'XYZ123' are shown and, in addition, 'Compliant—IAM' which indicates whether the system is compliant with identity and access management requirements, e.g. a requirement that two factor authentication is enabled on the system; 'Virtual Machine', which indicates whether the system is a virtual machine; and 'Application1 Present', which indicates whether 'Application1' is present on the system. The properties interface element 630 may also include checkbox elements alongside each of the properties.

The properties interface element 630 may include a generate event detector button 632. By interacting with the generate event detector button 632, e.g. by clicking on it, an event detector may be generated or caused to be generated based on one or more selected properties, e.g. properties for which the checkbox element alongside them is checked. The generated one or more event detectors may take any of the forms described above. On interacting with the generate event detector button 632, additional GUI elements (not shown) may be displayed for configuring an event detector and further interaction with these additional GUI elements may occur prior to the generation or the causing generation of the event detector, e.g. a button presented as part of these additional GUI elements may be clicked prior to the generation or the causing generation of the event detector. The additional GUI elements may be displayed as part of the illustrated GUI or may be part of a new tab, window or overlay.

In the shown example, properties interface element 630, the properties Network Zone, Virtual Machine and Application1 Present are selected. When the generate event detector button 632 is interacted with, an event detector may be generated based on these properties. For example, an event detector may be generated which detects events where the relevant system is in the network zone 'SafeZone', is not a virtual machine and on which the application 'Application1' is present.

The properties interface element may include an expand button 634. By interacting with the expand button 634, further properties of the entity may be displayed. For example, the user may click on the shown expand button 634 to show more properties of the system 'XYZ123'.

The graphical user interface 600 may include a linked objects interface element 640. The linked objects interface element 640 may list the names of objects associated with the entity. By clicking on the names of the objects, further properties of the objects may be shown and/or a user interface showing properties of the object may be displayed. The shown linked objects interface element 640 shows Login objects. The Login objects each relate to a login to the system 'XYZ123' and the user associated with the login. The linked objects interface element 640 also shows Event objects. The Event objects each relate to a suspicious system event occurring on the system 'XYZ123'.

The linked objects interface element 640 may include an expand button 642. By interacting with the expand button 634, further objects associated with the entity may be displayed. For example, the user may click on the expand button 642 to show more objects associated with the system 'XYZ123'.

The graphical user interface 600 may include an object graph interface element 650. The object graph interface element 650 may show an object graph indicating relationships between one or more objects associated with the entity. For example, the object graph interface element 650 shows several objects associated with the system 'XYZ123'. The object graph interface element 650 includes user objects, login objects, event objects, and a system object. A user object 'Alice Jones' has an account relationship with a login object indicating that Alice Jones' user account was used for that login. The system 'XYZ123' has a system relationship with this login object indicating that the login was into the system 'XYZ123'. Another login object has an account relationship with a 'John Smith' user object and the system 'XYZ123'. The graph also includes several event objects indicative of suspicious system events. The event object 'VirusEvt1' has a system relationship with the system XYZ123' indicating that the event 'VirusEvt1' occurred on the system 'XYZ123'. The event object 'VirusEvt2' has a system relationship with the system XYZ123' indicating that the event 'VirusEvt2' occurred on the system 'XYZ123'. The event object 'CompromisedAppEvt1' has a system relationship with the system 'XYZ123' indicating that the event 'CompromisedAppEvt1' occurred on the system 'XYZ123'. The event object 'CompromisedAppEvt1' has an account relationship with the user object 'John Smith' indicating that the account of the user 'John Smith' was responsible for the event 'CompromisedAppEvt1', e.g. 'John Smith' may have run a compromised application such as 'Application1' on the system 'XYZ123'.

EXTENSIONS AND ALTERNATIVES

It is understood that any specific order or hierarchy of steps in the methods disclosed are an illustration of example approaches. Based upon design preferences, it is understood that the specific order or hierarchy of steps in the methods may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

What is claimed is:

1. A method, performed by one or more processors, comprising:
   receiving a plurality of system event records;
   processing the plurality of system event records using a set of event detectors to determine that a suspicious system event associated with a first system has occurred;
   determining, for each of a plurality of properties associated with the suspicious system event, a corresponding plurality of property values, wherein the plurality of properties include one or more event properties associated with the suspicious system event, properties of the first system, or vulnerability properties associated with the first system;
   sending, to a client device, the determined plurality of property values associated with the suspicious system event, wherein the plurality of property values are displayed on a user interface comprising a plurality of user interface elements corresponding to the plurality of properties;
   receiving, from the client device, user input of one or more user interface elements indicating a selected one or more property values of the plurality of property values associated with the suspicious system event;
   in response to receiving the one or more property values selected by user input, initiating generation of one or more new event detectors based on the one or more property values selected by user input; and
   adding the one or more new event detectors to the set of event detectors.

2. The method of claim 1, wherein the plurality of system event records comprise system log records.

3. The method of claim 1, wherein the plurality of system event records comprise records generated by a security monitoring application.

4. The method of claim 1, wherein receiving the plurality of system event records comprises receiving a respective one or more system event records for each of a plurality of systems.

5. The method of claim 1, wherein vulnerability properties indicate one or more known security vulnerabilities of the first system on which the suspicious system event occurred.

6. The method of claim 1, comprising:
   receiving a second plurality of system event records; and
   determining a second one or more system event records of the second plurality of system event records to be indicative of an occurrence of a second suspicious system event based on the one or more new event detectors.

7. The method of claim 6, further comprising sending a plurality of properties associated with the second suspicious system event to the client device.

8. A computing system comprising:
a hardware computer processor; and
a non-transitory computer readable medium having software instructions stored thereon, the software instructions executable by the hardware computer processor to cause the computing system to perform operations comprising:
   receiving from a server:
      a plurality of properties associated with a detected suspicious system event, the plurality of properties including one or more: event properties associated with the detected suspicious system event, properties of a first system, or vulnerability properties associated with the first system; and
      for each of the plurality of properties, a corresponding plurality of property values;
   displaying a user interface indicating the plurality of property values and a plurality of user interface elements corresponding to the plurality of property values;
   receiving user input of one or more user interface elements indicating selection of one or more corresponding property values; and
   responsive to the user input, initiating generation of one or more new event detectors by sending, to the server, a selection indicator indicating the selected one or more property values, wherein the one or more new event detectors are based on the one or more property values selected by user input, and wherein the new event detectors are configured to detect suspicious system events.

9. The computing system of claim 8, wherein the operations further comprise receiving an event descriptor, wherein the event descriptor comprises the plurality of properties associated with the suspicious system event.

10. The computing system of claim 8, wherein the properties indicate one or more known security vulnerabilities of the first system on which the suspicious system event occurred.

11. The computing system of claim 8, wherein the operations further comprise:
   receiving, from the server, a plurality of properties associated with a second suspicious system event, wherein the server has determined that the second suspicious system event has occurred based on one or more new event detectors; and
   displaying the plurality of properties associated with the second suspicious system event.

12. A non-transitory computer readable medium having software instructions stored thereon, the software instructions executable by a hardware computer processor to cause a computing system to perform operations comprising:
   receiving a plurality of system event records;
   processing the plurality of system event records using a set of event detectors to determine that a suspicious system event associated with a first system has occurred;
   determining, for each of a plurality of properties associated with the suspicious system event, a corresponding plurality of property values, wherein the plurality of properties include one or more event properties associated with the suspicious system event, properties of the first system, or vulnerability properties associated with the first system;
   sending, to a client device, the determined plurality of property values associated with the suspicious system event, wherein the plurality of property values are displayed on a user interface comprising a plurality of user interface elements corresponding to the plurality of properties;
   receiving, from the client device, one or more property values selected by user input via the user interface;
   initiating generation of one or more new event detectors based on the one or more property values selected by user input; and
   adding the one or more new event detectors to the set of event detectors.

13. The computer readable medium of claim 12, wherein the plurality of system event records comprise system log records.

14. The computer readable medium of claim 12, wherein the plurality of system event records comprise records generated by a security monitoring application.

* * * * *